United States Patent
Santhanakrishnan et al.

(10) Patent No.: US 8,347,035 B2
(45) Date of Patent: Jan. 1, 2013

(54) POSTING WEAKLY ORDERED TRANSACTIONS

(75) Inventors: Geeyarpuram N. Santhanakrishnan, Portland, OR (US); Julius Mandelblat, Haifa (IL); Ehud Cohen, Kiryat Motskin (IL); Larisa Novakovsky, Haifa (IL); Zeev Offen, Folsom, CA (US); Michelle J. Moravan, Haifa (IL); Shlomo Raikin, Geva Carmel (IL); Ron Gabor, Raanana (IL)

(73) Assignee: Intel Corporation, Santa Clara, CA (US)

(*) Notice: Subject to any disclaimer, the term of this patent is extended or adjusted under 35 U.S.C. 154(b) by 770 days.

(21) Appl. No.: 12/338,919

(22) Filed: Dec. 18, 2008

(65) Prior Publication Data

US 2010/0161907 A1    Jun. 24, 2010

(51) Int. Cl.
*G06F 12/00* (2006.01)

(52) U.S. Cl. ......... 711/118; 711/122; 711/124; 711/146

(58) Field of Classification Search .................. 711/118, 711/122, 124, 146
See application file for complete search history.

(56) References Cited

U.S. PATENT DOCUMENTS

| | | | | |
|---|---|---|---|---|
| 6,347,361 B1 * | 2/2002 | Arimilli et al. | ............... | 711/141 |
| 6,418,514 B1 * | 7/2002 | Arimilli et al. | ............... | 711/133 |
| 7,099,215 B1 * | 8/2006 | Rotenberg et al. | ............ | 365/204 |
| 7,818,511 B2 * | 10/2010 | Goodman et al. | ............ | 711/146 |
| 7,856,532 B2 * | 12/2010 | Lataille et al. | ................ | 711/133 |
| 2002/0078305 A1 * | 6/2002 | Khare et al. | .................... | 711/144 |
| 2003/0070016 A1 * | 4/2003 | Jones et al. | .................... | 710/107 |
| 2004/0044850 A1 * | 3/2004 | George et al. | ................. | 711/131 |
| 2006/0080508 A1 * | 4/2006 | Hoover et al. | ................ | 711/133 |
| 2006/0080511 A1 * | 4/2006 | Hoover et al. | ................ | 711/141 |
| 2006/0179250 A1 * | 8/2006 | Guthrie et al. | ................ | 711/143 |
| 2008/0091884 A1 * | 4/2008 | Piry et al. | ...................... | 711/141 |
| 2008/0209131 A1 * | 8/2008 | Kornegay et al. | ............ | 711/135 |
| 2009/0113134 A1 * | 4/2009 | Irish et al. | ..................... | 711/134 |
| 2009/0248850 A1 * | 10/2009 | Thangadurai et al. | ........ | 709/224 |

* cited by examiner

*Primary Examiner* — Jared I Rutz
*Assistant Examiner* — Gurtej Bansal
(74) *Attorney, Agent, or Firm* — Trop, Pruner & Hu, P.C.

(57) ABSTRACT

A processor may comprise a core area, a control unit, an uncore area. The core area may comprise multiple processing cores and line-fill buffers. A first processing core of the core area may store a first weakly ordered transaction in a first line-fill buffer. The firs processing core may offload the first weakly ordered transaction to the extended buffer space provisioned in the uncore area after receiving a request from the uncore area. The first processing core may then de-allocate the first line-fill buffer after the first weakly ordered transaction is offloaded to the extended buffer space. The uncore may then post the first weakly ordered transaction to a memory or a memory system. The control unit may track the first weakly ordered transaction to ensure that the first weakly ordered transaction is posted to the memory or the system.

20 Claims, 5 Drawing Sheets

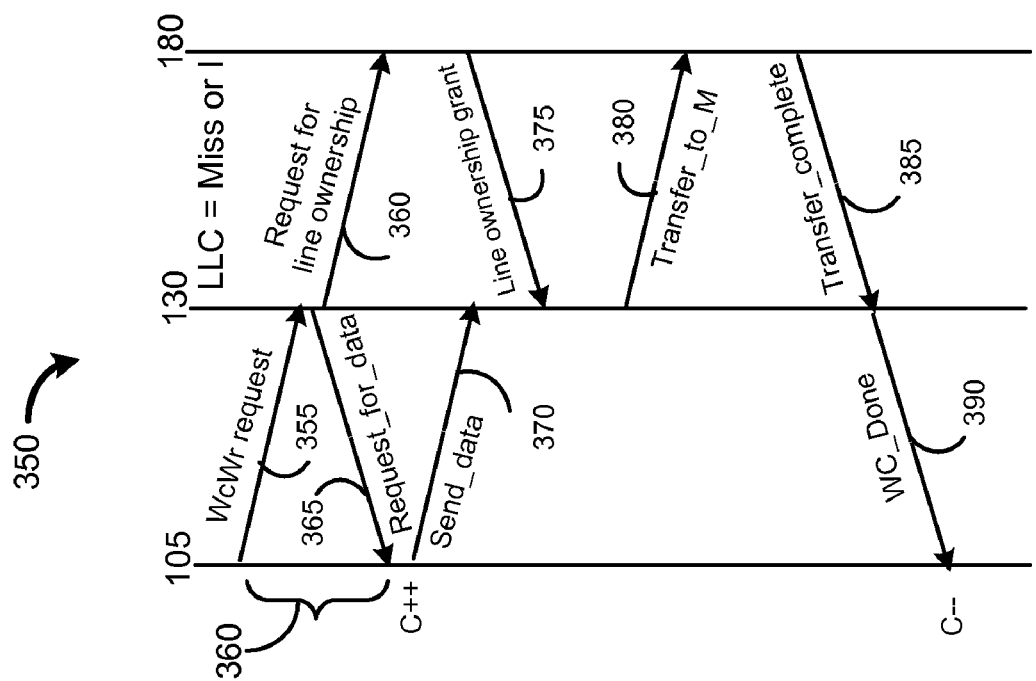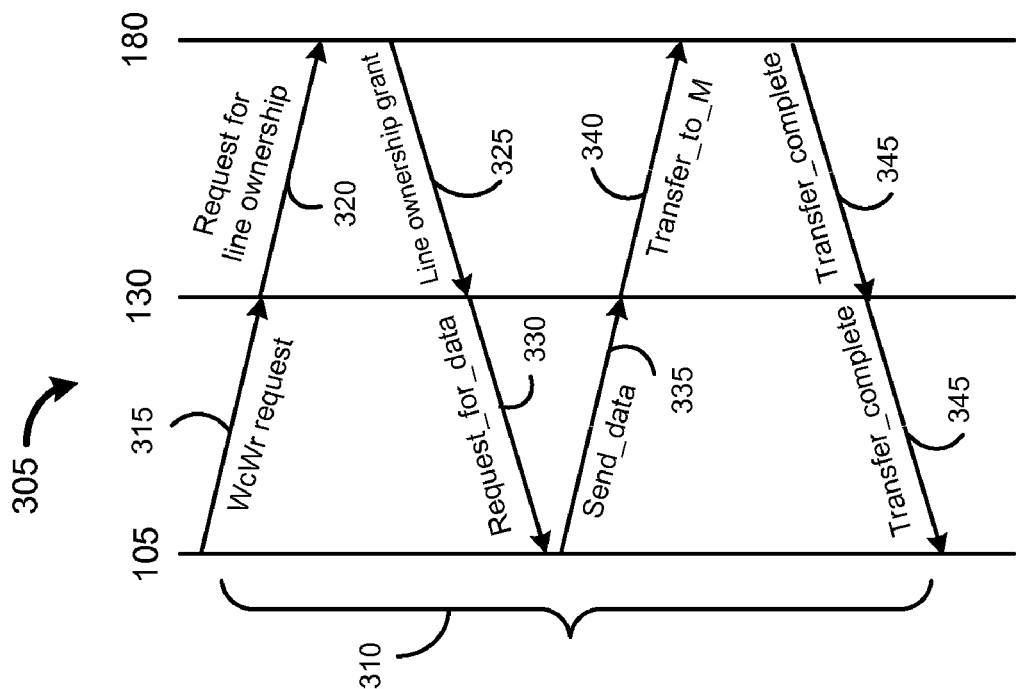
FIG. 3

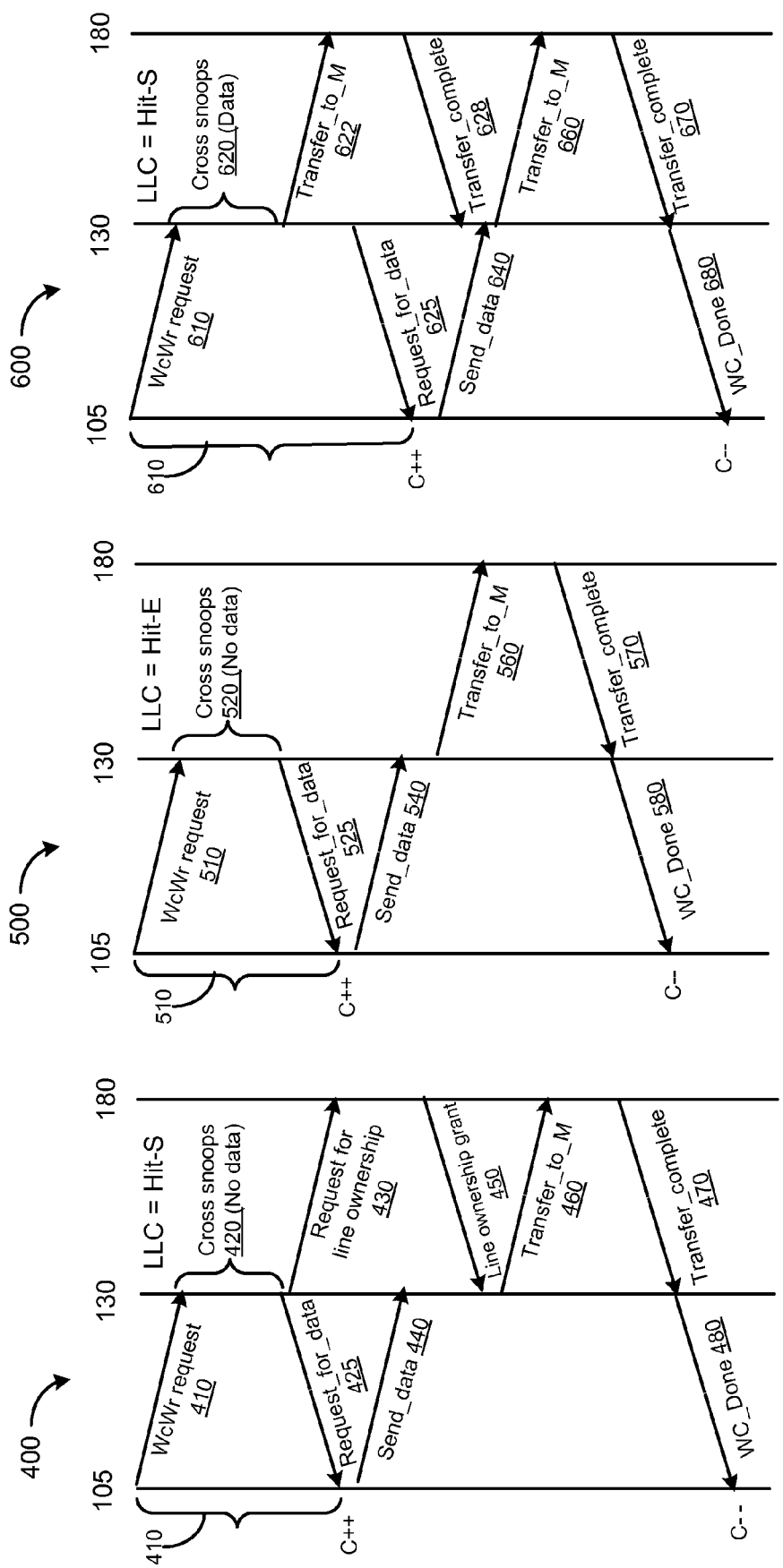

POSTING WEAKLY ORDERED TRANSACTIONS

BACKGROUND

A computer system may comprise a processor, which may include a core area and an uncore area. The core area may include one or more processing cores, caches (L1 and L2, for example), line-fill buffers and the uncore area may comprise shared mid-level or last level cache, an integrated memory controller, and such other components. The line fill buffers (LFB) in the core area may be used to stage out or post transactions to the uncore area. LFBs may be used to stage load and store, weakly ordered transactions such as a write combining write transactions, and such other transactions. It may be desirable to reduce the time that a transaction resides in LFB to increase the performance of the processor and the computer system in which the processor is included.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 3 is a line diagram illustrating the posting of weakly ordered transactions while a cache miss occurs at a last level cache according to one embodiment.

FIG. 4 is a line diagram illustrating the posting of weakly ordered transactions while S-state cache hit occurs at a last level cache according to one embodiment.

FIG. 5 is a line diagram illustrating the posting of weakly ordered transactions while E-state cache hit occurs at a last level cache according to one embodiment.

FIG. 6 is a line diagram illustrating the posting of weakly ordered transactions while M-state cache hit occurs at a last level cache according to one embodiment.

DETAILED DESCRIPTION

The following description describes embodiments of a technique to post weakly ordered transactions. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
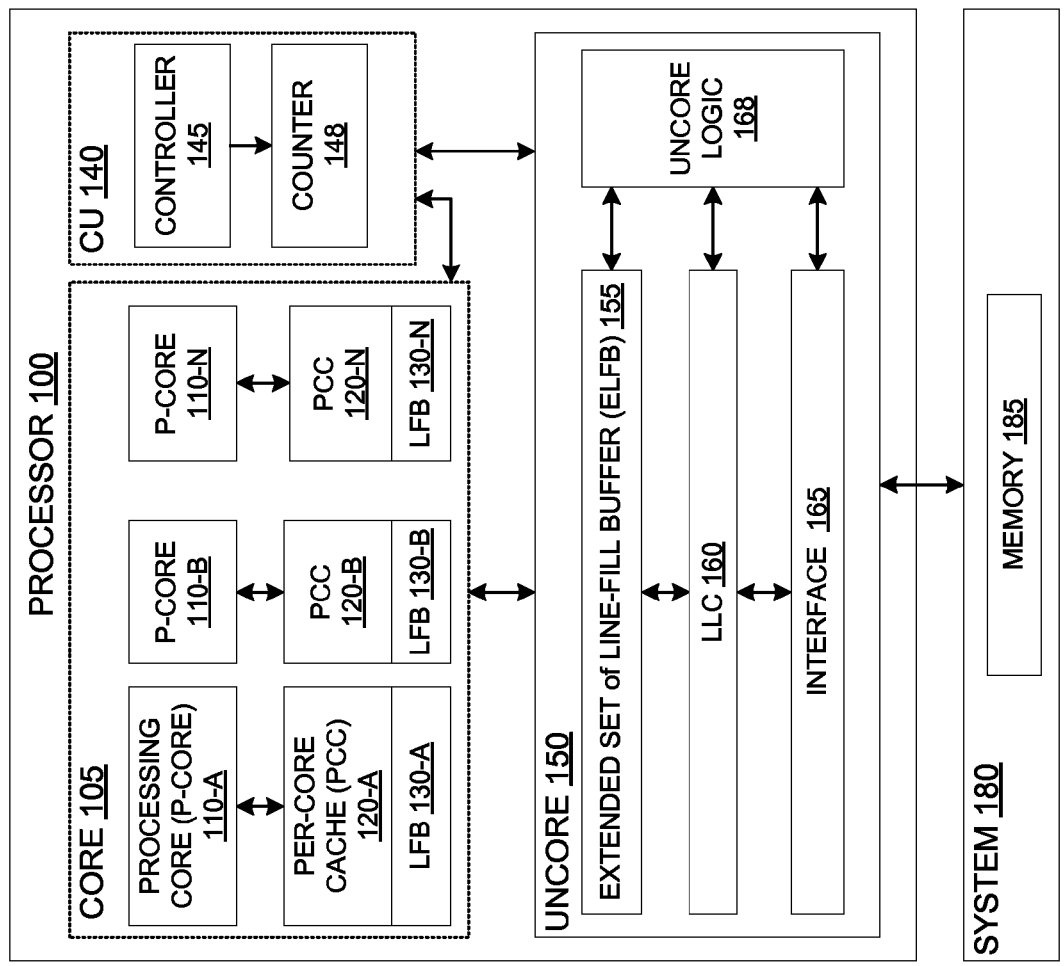
FIG. 1 illustrates a processor 100, which supports a technique for posting weakly ordered transactions while decreasing the time that the transactions reside in the core according to one embodiment.

A processor 100, which may support techniques to post weakly ordered transactions while decreasing the time the transactions reside in the core in accordance with one embodiment is illustrated in FIG. 1. In one embodiment, the processor 100 may comprise a core 105, control unit 140, uncore 150, and a system 180. In one embodiment, the core 105 and the uncore 150 may support a point-to-point bidirectional bus to enhance communication between the p-cores 110 and between the core 105 and the uncore 150.

In one embodiment, the core 105 may comprise processing cores such as pcore 110-A to 110-N, per-core caches 120-A to 120-N associated with the p-cores 110-A to 110-N, respectively, and line-fill buffers (LFB) 130-A to 130-N associated with the p-cores 110-A to 110-N, respectively. In one embodiment, the p-cores 110 may support instruction fetch, execute, and decode operations, and also performance enhancement techniques such as thread level parallelism. In one embodiment, the per-core caches 120 may include memory technologies that may support higher access speeds, which may decrease the latency of instruction and data fetches as compared to fetching data and instructions from the memory 185, for example.

In one embodiment, the core 105 may support LFB virtualization, which may provide a mechanism for the core 105 to use extended resources such as an extended set of line fill buffers (ELFB) of the uncore 150 to post weakly ordered transactions. In one embodiment, the p-cores 110-A to 110-N may post weakly ordered transactions such as the write combining write, which may reside in the LFB 130-A before the transaction may reach the uncore 150. As the resources such as the LFBs 130 are prime and limited, the residing time of the transactions in the LFBs 130 may be reduced to enhance the performance of the core 105. In one embodiment, the ELFBs may be provisioned in the uncore 150 and the transactions stored in the LFBs 130 may be quickly offloaded to the ELFBs. In one embodiment, the LFBs may be de-allocated after offloading the transactions to ELFB. As a result of de-allocating the LFBs the memory band-width performance of the processor 100 may be enhanced.

In one embodiment, the processing core 110-A may perform a read or a write transaction to read from or write to the memory 185. In one embodiment, the processing core 110-A may issue a write transaction to the memory 185. In one embodiment, the write transaction may reside in the LFB 130-A for a duration 310 shown in the line diagram 305 of FIG. 3. In one embodiment, the duration 310 may include the time consumed by the signaling and data transfer activities between the core 105 and the uncore 150 and the uncore 150 and the memory 185. As a result, the time duration 310 during which the transaction such as the write combining write transaction resides in the LFB 130-A may be substantially high. As the duration of 310 is substantially high, the LFB 130-A may not be available for the p-core 110-A to post other transactions, which may affect the performance of the processor 100.

In one embodiment, the p-core 110-A may issue a weakly ordered present transaction such as a write combining write request (WcWr) to the uncore 130. In one embodiment, the p-core 110-A may send a 'perform_transaction' request to the uncore 150 after storing the transaction in the LFB 130-A. In one embodiment, the 'perform_transaction' request may comprise an identifier of the hardware thread (thread_id), which generated the 'perform_transaction' request and the state (for example, one of the states of the MESI coherency protocol) of the transaction. In one embodiment, in response to sending 'perform_transaction' request, the score 110-A may receive a 'request for_data' signal.

In one embodiment, the p-core 110-A may send or offload the present transaction stored in the LFB 130-A to the uncore 150 in response to receiving the 'request_for_data' signal. In one embodiment, the pcore 110-A may generate 'send_data' signal, which may comprise the transaction stored in the LFB 130-A. In one embodiment, the p-core 110-A may also send a 'track_initiate' signal to the control unit 140 after receiving the 'request_for_data' signal. In one embodiment, the 'track_initiate' signal may also comprise the 'thread_id' of the p-core 110-A, which generated the 'perform_transaction' request.

In one embodiment, the p-core 110-A may offload the present transaction to the uncore 150. In one embodiment, the LFB 130-A may be de-allocated after the offloading the transaction to the uncore 150. In one embodiment, de-allocating the LFB 130-A may, quickly, make the LFB 130-A available for storing a next transaction. In one embodiment, the p-core 110-A may receive a 'transaction_complete' signal from the uncore 150 after the present transaction is completed. In one embodiment, the 'transaction_complete' for the present transaction may be generated after the transaction is transferred to the memory 185 or to the memory controller buffers. In one embodiment, the p-core 110-A may send a 'track_complete' signal to the control unit 140. In one embodiment, the 'track_complete" signal may comprise the 'track_id' of the p-core 110-A.

As a result, the duration for which the present transaction resides in the LFB 130-A may be substantially less than the duration 310. As a result, the LFB 310-A may be quickly available to post other transactions that may improve the performance of the processor 100. In one embodiment, the duration for which the transaction resides in the LFB 130-A may be based on the state (M or E or S or I, for example) of the cache-line. However, the duration for which the transaction resides in the LFB 130-A in any of the state may be substantially less than the duration 310.

In one embodiment, the control unit 140 may comprise a controller 145 and a counter 148. In one embodiment, the counter 148 may comprise thread-specific counters. In one embodiment, the controller 145 may receive the 'track_initiate' signal from the p-core 110-A and based on the 'thread_id' field of the 'track_initiate' signal, the controller 145 may increment a thread-specific counter associated with the thread or the p-core 110. In one embodiment, the thread-specific counters 148 may be used to track the outstanding transactions in the uncore 150 that may be pending before posted to the memory 185.

In one embodiment, the controller 145 may receive the 'track_complete' signal from the core 105 after the present transaction may be written to the memory 185. In one embodiment, the controller 145 may decrement the counter 148 in response to receiving the 'track_complete' signal. In one embodiment, the processor 100 may comprise the control unit 140 outside the core 105 and in other embodiment, the core 105 may comprise the control unit 140.

In one embodiment, the uncore 150 may comprise an extended set of line fill buffers (ELFB) 155, last level cache (LLC) 160, an interface 165, and an uncore logic 168. In one embodiment, the uncore 130 may support cache coherency techniques to ensure correctness of data. In one embodiment, the uncore 130 may support MESI (Modified-Exclusive-Shared-lnvalid) protocol for maintaining cache coherency in the LLC 160 and the memory coherency in the memory 185.

In one embodiment, the interface 165 may receive transactions from the core 105 and transfer the transactions to the uncore 150. Also, in one embodiment, the interface may couple the system 180 to the uncore 150. In one embodiment, the interface 165 may handle the translations while transferring transactions between the core 105, uncore 150, the control unit 140, and the system 180.

In one embodiment, the cache memory may be differentiated into levels based on the size and the position of the cache memory in the processor 100. In one embodiment, the last level cache (LLC) 160 may refer to a level L2 or level 3 (L3) cache, which may be larger in size compared to a level 1 (L1) cache. In one embodiment, LLC 160 may comprise cache lines, which may comprise a block (e.g., 512 bits) of data retrieved from the memory 185 or the data that may be written to the memory 185.

In one embodiment, the uncore logic 168 may receive 'perform_transaction' signal and based on the cache-line state may generate signals to cause transactions stored in the LFB 130-A to be offloaded to the ELFB 160. In one embodiment, the uncore logic 168 may send signals to the system 180 to gain ownership of the line to transfer the transaction to the system 180. In one embodiment, after the ownership of the line is granted, the uncore logic 168 may generate the 'request_for_data' signal and send the 'request_for_data' signal to the p-core 110-A of the core 105.

In one embodiment, the 'request_for_data' signal may comprise the 'thread_id' using which the 'request_for_data' signal may be steered to the p-core 110-A. In one embodiment, in response to the 'request_for_data' signal, the uncore logic 168 may receive the 'send_data' signal comprising transaction stored in the LFB 130-A and may store the transaction in the ELFB 160. In one embodiment, the uncore logic 165 may transfer the transaction to the memory 185. In one embodiment, the uncore logic 165 may generate the 'transaction_complete' signal in response to the receiving a transfer_complete signal, which may indicate that the transaction is transferred to the memory 185.

Figure 2:
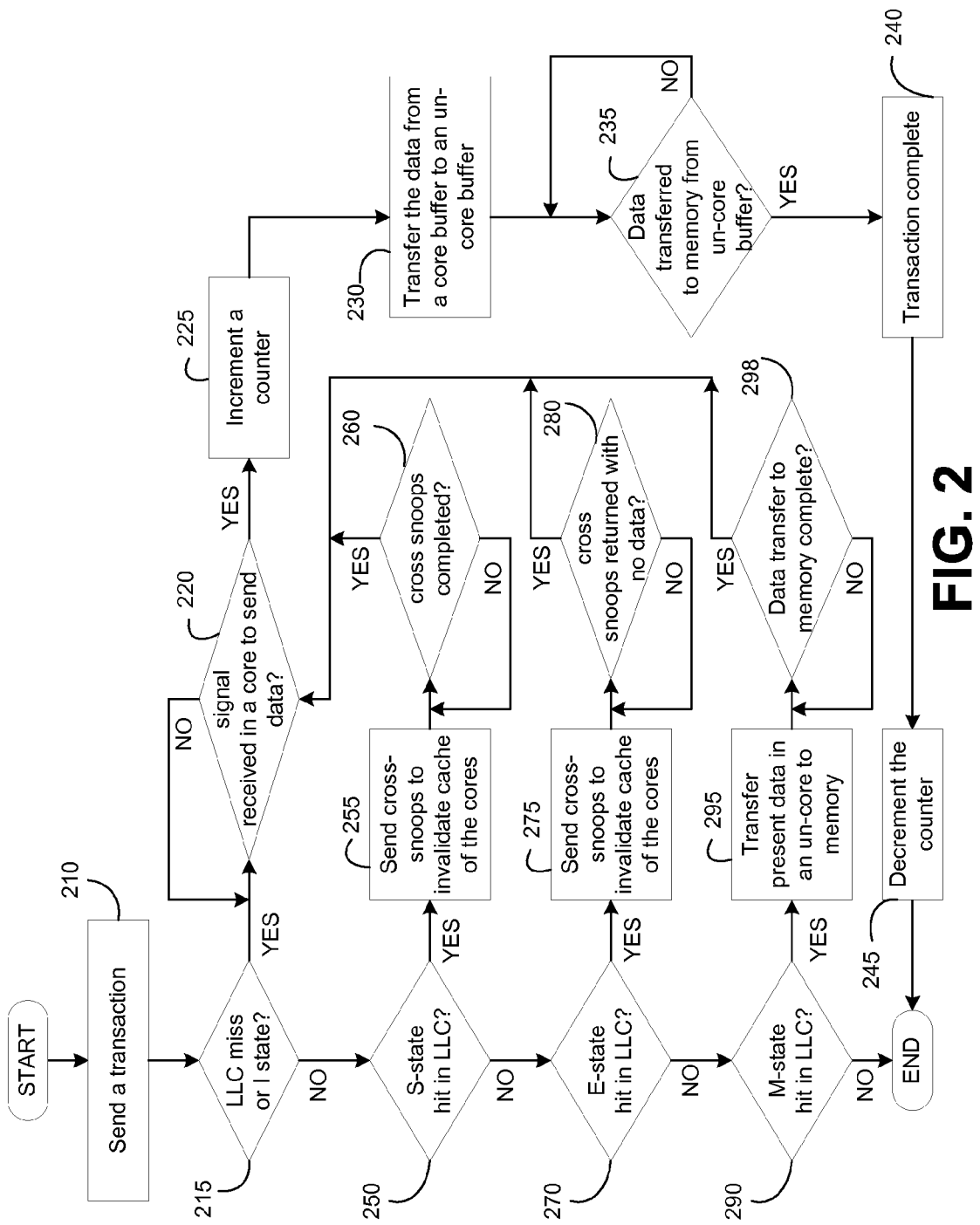
FIG. 2 is a flow chart illustrating posting of weakly ordered transactions while decreasing the time that the transactions reside in the core according to one embodiment.

A flowchart depicting posting a transaction while decreasing the time that the transaction resides in the core 105 in accordance with one embodiment is illustrated in FIG. 2.

In block 210, the core 105 may generate a transaction such as a write combining write request (WcWr) and send the transaction (WcWr request) to the uncore 150. In one embodiment, the p-core 110A may generate the transaction and store the transaction in the LFB 130-A.

In block 215, the uncore 150 may check the state of the request and control passes to block 220 if the state represents a cache miss or cache invalid state and to block 250 if the state does not represent a cache miss or cache invalid state. In one embodiment, the state may represent one of M or E or S or I states of a MESI coherency protocol.

In block 220, the core 105 may check if a signal is received to send data and control passes block 225 if the signal is received and may otherwise wait until the signal is received. In one embodiment, the uncore 150 may send the 'request_for_data' signal to the core 105 after receiving the WcWr request.

In block 225, the core 105 may send a signal such as the 'track_activate' signal, which may cause the counter 145 to increment the counter 148. In block 230, the core 105 may transfer the transaction from the core buffer such as the LFB 130-A to the uncore buffer such as the ELFB 155. In one embodiment, the core 105 may send the transaction stored in the LFB 130-A as a part of the 'send_data' signal to the uncore 150.

In block 235, the uncore 150 may track the status of the posted transaction to determine whether the posted transaction has reached the memory 185 and control passes to block 240 if the posted transaction reaches the memory 185. In one embodiment, the uncore 150 may track the posted transaction until the 'transaction_complete' is received from the memory 185. In block 240, the uncore 150 may send the 'transaction_complete' signal to the core 105. In block 245, the core 105 may send a signal such as the 'track_complete' signal to the control unit 140 and the controller 145 may decrement the counter 148 to indicate that the transaction is complete and the process ends.

Block 250 may be reached if the state is not equal to cache invalid or a cache miss state. In block 250, the uncore 150 may check if the state is equal to a shared (S) state and control passes to block 255 if the state is equal to a shared (S) state and may otherwise pass to block 270.

In block 255, the uncore 150 may generate cross snoops, which may be sent to invalidate per core caches PCC 120-B to 120-N of the other processing cores such as the p-core 110-B to 110-N. In one embodiment, invalidating the PCC 120-B to 120-N associated with the other scores 110-B to 110-N may protect the other caches from being written.

In block 260, the uncore 150 may check whether the cross snoops are complete and control passes to block 220 if the cross snoops are completed and may otherwise wait until the cross snoops are completed.

In block 270, the uncore 150 may check if the state is equal to an Exclusive (E) state and control passes to block 275 if the state is equal to an Exclusive (E) state and may otherwise pass to block 290.

In block 275, the uncore 150 may generate cross snoops, which may be sent to invalidate per core caches PCC 120-B to 120-N of the other processing cores such as the p-core 110-B to 110-N. In one embodiment, invalidating the PCC 120-B to 120-N associated with the other p-cores 110-B to 110-N may protect the other caches from being written.

In block 280, the uncore 150 may check whether the cross snoops returned without data and control passes to block 220 if the cross snoops returned without data and may otherwise wait until the cross snoops return without data.

In block 290, the uncore 150 may check if the state is equal to a Modified (M) state and control passes to block 295 if the state is equal to a Modified (M) state.

In block 295, the uncore 150 may transfer the data or the transaction stored in the ELFB 155 to the memory 185 or the system 180. In block 298, the uncore 150 may check if the data transfer to the memory 185 or the system 180 is complete and control passes to block 220 if the transfer is complete and may otherwise wait until the transfer is complete.

Line diagram 350 depicting the posting of weakly ordered transactions while a cache miss occurs at a last level cache according to one embodiment is illustrated in FIG. 3. A line diagram 305 depicts posting of weakly ordered transaction while the transaction resides in the LFB s 150 until a confirmation that the transaction is transferred to memory 185 is received. In one embodiment, the core 105 may send a perform transaction signal such as a WcWr request 315 to the uncore 150 and the uncore 150 may send a request for line ownership signal 320 to the system 180. After receiving the line ownership grant signal 325 from the system 180, the uncore 150 may send the request_for_data signal 330 to the core 105.

The core 105 may provide 'send_data' signal comprising the transaction stored in the LFB such as the LFB 130-A to the uncore 150. The transaction may continue to remain in the LFB 130-A even after the 'send_data' signal is provided while waiting for the confirmation that the transaction is sent to the system 180. The uncore 150 may send the data to the memory depicted by 'Transfer_to_M' 340 and after receiving the confirmation 'Transfer_complete' 345 from the system 180, the uncore 150 may forward the confirmation 'Transfer_complete' 345 to the core 105. Until receiving the confirmation 'Transfer_complete' 345, the core 105 may not overwrite the LFB 130-A, for example. The transaction resides in the LFB 130-A for the duration 310, which may be substantially large.

In one embodiment, the line diagram 350 depicts posting of a weakly ordered transaction in which the time the transaction resides in the LFB is substantially decreased. As shown in line diagram 350, the core 105 may send a 'WcWr request' 355 to the uncore 150 while performing a transaction and the uncore 150 may check the state, which may equal Invalid or Miss state and the uncore 150 may send a 'request_for_data' 365 to the core 105 and may then send a request for line ownership signal 360 to the system 180.

In one embodiment, the core 105 may, in response to receiving 'request_for_data' 365' send an activation signal to the CU 140, which may increment the counter 148 as indicated by C++ and the core 105 may offload the transaction stored in the LFB 130 to the ELFB 155 by using a 'Send_data' signal 370. In one embodiment, the core 105 may use the LFB 130-A to store other transaction after the transaction is offloaded to ELFB 155. As a result, the LFB 130-A may be available to support other transactions generated by the core 105. In one embodiment, the time that the transaction resides in the core 105 may be represented by duration 360, which may be substantially less compared to the duration 310.

In one embodiment, the uncore 150 may receive the offloaded transaction and may store the transaction in the ELFB 155. After receiving the line ownership grant signal 375, the uncore 150 may transfer the transaction stored in the ELFB 155 to the system 180 by sending a 'Transfer_to_M' signal 380. In one embodiment, the uncore 150 may receive a 'Transfer_complete' 385 after the transaction is transferred to the system 180 or the memory 185. In one embodiment, the uncore 150 may forward the 'Transfer_complete' 385 signal to the core 105 as 'WC_Done' signal 390.

In one embodiment, the core 105 may send a signal such as 'track_complete' signal to the control unit 140, which may decrement the counter 148 indicated by C--. As a result of providing an extended buffer space such as the ELFB 155 in the uncore 150, the time that the transaction may reside in the core 105 may be substantially reduced. Such an approach may increase the performance of the processor 100.

Line diagram 400 depicting the posting of weakly ordered transactions while S-state cache hit occurs at a last level cache according to one embodiment is illustrated in FIG. 4. As shown in line diagram 400, the core 105 may send a 'WcWr request' 410 to the uncore 150 while performing a transaction and the uncore 150 may check the state, which may equal 1a shared (S) state and the uncore 150 may send cross snoops 420 to the PCC 120-B to 120-N associated with the p-cores 110-B to 110-N, respectively, to invalidate the PCCs 120-B to 120-N. In one embodiment, the uncore 150 may send a 'request_for_data' 425 to the core 105 and may then send a request for line ownership signal 430 to the system 180.

In one embodiment, the core 105 may, in response to receiving 'request for_data' 425' send an activation signal ('track_activate) to the CU 140, which may increment the counter 148 as indicated by C++. In one embodiment, the core 105 may offload the transaction stored in the LFB 130-A to the ELFB 155 by using a 'send_data' signal 440. In one embodiment, the core 105 may use the LFB 130-A to store other transaction after the transaction is offloaded to ELFB 155. As a result, the LFB 130-A may be available to support other transactions generated by the core 105. In one embodiment, the time that the transaction resides in the core 105 may be represented by duration 410, which may be substantially less compared to the duration 310.

In one embodiment, the uncore 150 may receive the offloaded transaction and may store the transaction in the ELFB 155. After receiving the line ownership grant signal 450, the uncore 150 may transfer the transaction stored in the ELFB 155 to the system 180 by sending a 'Transfer_to_M' signal 460. In one embodiment, the uncore 150 may receive a 'Transfer_complete' 470 after the transaction is transferred to the system 180 or the memory 185. In one embodiment, the uncore 150 may forward the 'Transfer_complete' 470 signal to the core 105 as 'WC_Done' signal 480.

In one embodiment, the core 105, in response to receiving 'WC_Done' 480' may send a signal such as 'track_complete' signal to the control unit 140, which may decrement the counter 148 indicated by C--. As a result of providing an extended buffer space such as the ELFB 155 in the uncore 150, the time that the transaction may reside in the core 105 may be substantially reduced.

Line diagram 500 depicting the posting of weakly ordered transactions while E-state cache hit occurs at a last level cache according to one embodiment is illustrated in FIG. 5. As shown in line diagram 500, the core 105 may send a 'WcWr request' 510 to the uncore 150 while performing a transaction and the uncore 150 may check the state, which may equal an Exclusive (E) state and the uncore 150 may send cross snoops 520 to the PCC 120-B to 120-N associated with the p-cores 110-B to 110-N, respectively, to invalidate the PCCs 120-B to 120-N. In one embodiment, the uncore 150 may send a 'request_for_data' 525 to the core 105.

In one embodiment, the core 105 may, in response to receiving 'request_for_data' 525' send an activation signal ('track_activate) to the CU 140, which may increment the counter 148 as indicated by C++. In one embodiment, the core 105 may offload the transaction stored in the LFB 130-A to the ELFB 155 by using a 'send_data' signal 540. In one embodiment, the core 105 may use the LFB 130-A to store other transaction after the transaction is offloaded to ELFB 155. As a result, the LFB 130-A may be available to support other transactions generated by the core 105. In one embodiment, the time that the transaction resides in the core 105 may be represented by duration 510, which may be substantially less compared to the duration 310.

In one embodiment, the uncore 150 may receive the offloaded transaction and may store the transaction in the ELFB 155. In one embodiment, the uncore 150 may transfer the transaction stored in the ELFB 155 to the system 180 by sending a 'Transfer_to_M' signal 560. In one embodiment, the uncore 150 may receive a 'Transfer_complete' 570 after the transaction is transferred to the system 180 or the memory 185. In one embodiment, the uncore 150 may forward the 'Transfer_complete' 570 signal to the core 105 as 'WC_Done' signal 580. In one embodiment, the core 105, in response to receiving 'WC_Done' 580', may send a signal such as 'track_complete' signal to the control unit 140, which may decrement the counter 148 indicated by C--. As a result of providing an extended buffer space such as the ELFB 155 in the uncore 150, the time that the transaction may reside in the core 105 may be substantially reduced.

Line diagram 600 depicting the posting of weakly ordered transactions while M-state cache hit occurs at a last level cache according to one embodiment is illustrated in FIG. 6. As shown in line diagram 600, the core 105 may send a 'WcWr request' 610 to the uncore 150 while performing a transaction and the uncore 150 may check the state, which may equal a Modified (M) state and the uncore 150 may send cross snoops 620 to the PCC 120-B to 120-N associated with the p-cores 110-B to 110-N, respectively, which may return with data. In one embodiment, the uncore 150 may transfer ('Transfer_to_M signal 622) the data received as a result of sending the cross snoops 620. In one embodiment, the uncore 150 may then send a 'request_for_data' 625 to the core 105. In one embodiment, the uncore 150 may receive 'Transfer_complete' signal 628 from the system 180. In one embodiment, the modified data may be stored into the system 180 or the memory 185 before the transaction stored in the LFB 130-A is transferred to the system 180. In one embodiment, storing the modified data in the system 180 may ensure that the data in the cache and the memory 185 are the same. In one embodiment, such an approach may ensure cache and memory coherency to be maintained.

In one embodiment, the core 105, in response to receiving 'request_for_data' 625' may send an activation signal ('track_activate) to the CU 140, which may increment the counter 148 as indicated by C++. In one embodiment, the core 105 may offload the transaction stored in the LFB 130-A to the ELFB 155 by using a 'send_data' signal 640. In one embodiment, the core 105 may use the LFB 130-A to store other transaction after the transaction is offloaded to ELFB 155. As a result, the LFB 130-A may be available to support other transactions generated by the core 105. In one embodiment, the time that the transaction resides in the core 105 may be represented by duration 610, which may be less compared to the duration 310.

In one embodiment, the uncore 150 may receive the offloaded transaction and may store the transaction in the ELFB 155. In one embodiment, the uncore 150 may transfer the transaction stored in the ELFB 155 to the system 180 by sending a 'Transfer_to_M' signal 660. In one embodiment, the uncore 150 may receive a 'Transfer_complete' 670 after the transaction is transferred to the system 180 or the memory 185. In one embodiment, the uncore 150 may forward the 'Transfer_complete' 670 signal to the core 105 as 'WC_Done' signal 680.

In one embodiment, the core 105, in response to receiving 'WC_Done' 680, may send a signal such as 'track_complete' signal to the control unit 140, which may decrement the counter 148 indicated by C−−. As a result of providing an extended buffer space such as the ELFB 155 in the uncore 150, the time that the transaction may reside in the core 105 may be substantially reduced.

Figure 7:
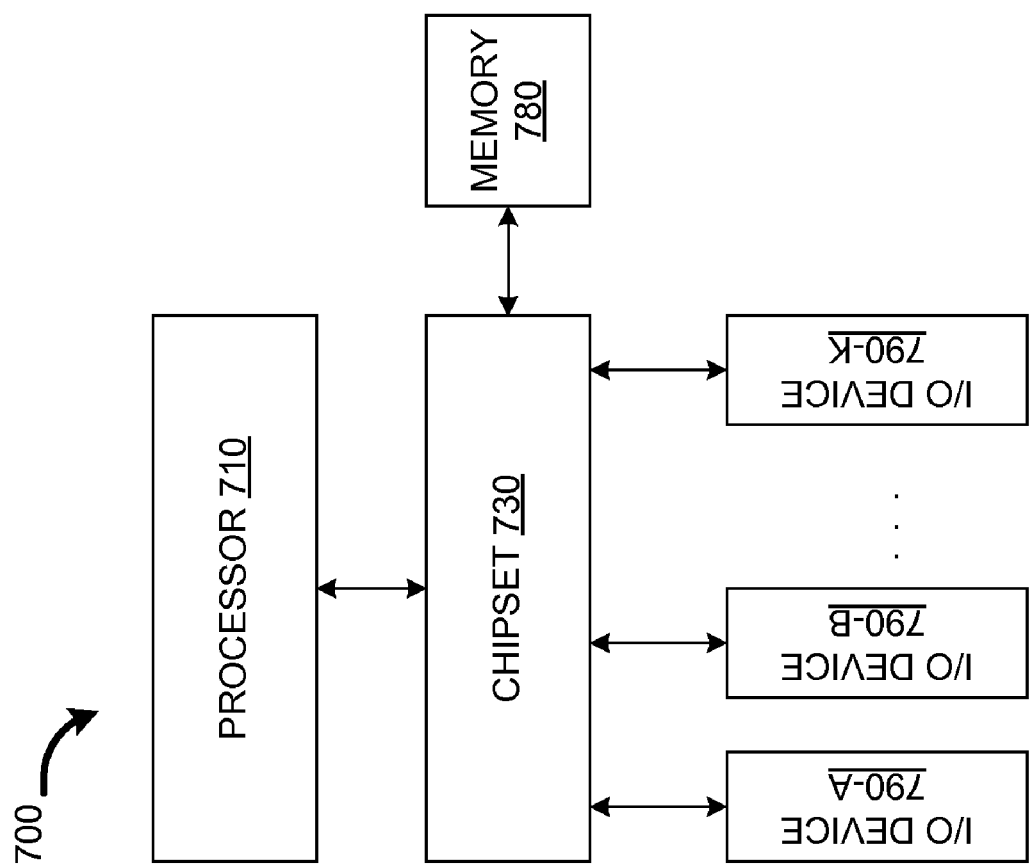
FIG. 7 is a computer system, which may support posting of weakly ordered transactions, while decreasing the time that the transactions reside in the core according to one embodiment.

A computer system 700, which may support techniques to post the weakly ordered transactions while decreasing the time that the transaction resides in the core in accordance with one embodiment, is illustrated in FIG. 7. In one embodiment, the computer system 700 may comprise some or all of a processor 710, a chipset 730, a memory 780, and 110 devices 790-A to 790-K.

The chipset 730 may comprise one or more integrated circuits or chips that operatively couple the processor 710, the memory 780, and the I/O devices 790. In one embodiment, the chipset 730 may couple the memory 780 and the I/O devices 790 to the processor 710. The chipset 730 may receive transactions generated by the I/O devices 790 on links such as the PCI Express links and may forward the transactions to the memory 780 or the processor 710. Also, the chipset 730 may generate and transmit transactions to the memory 780 and the I/O devices 790 on behalf of the processor 710.

The memory 780 may store data and/or software instructions and may comprise one or more different types of memory devices such as, for example, DRAM (Dynamic Random Access Memory) devices, SDRAM (Synchronous DRAM) devices, DDR (Double Data Rate) SDRAM devices, or other volatile and/or non-volatile memory devices used in a system such as the computer system 700. In one embodiment, the memory may be coupled to the chipset 730 and in other embodiment, the memory 780 may be coupled to the processor 710, directly.

The processor 710 may manage various resources and processes within the computer system 700 and may execute software instructions as well. In one embodiment, the processor 710 may comprise a core area such as the core 105 and an uncore area such as the uncore 150. In one embodiment, the core area may comprise one or more processing cores and associated per-core caches such as PCC 120-A to 120-N and line-fill buffers such as LFBs 130-A to 130-N. In one embodiment, the uncore area may be provisioned with extended buffer spaces such as the ELFB 155. In one embodiment, the processing core that generates the transaction may offload the transactions from the line-fill buffers of the core area to the extended buffer space in the uncore area. In one embodiment, offloading the transactions may allow de-allocating the line-fill buffers in the core area quickly after a transaction is posted. De-allocating the line-fill buffers of the core area quickly may enhance the performance of the processor 710.

The processor 710 may interface with the chipset 730 to transfer data to the memory 780 and the I/O devices 790. In one embodiment, the processor 710 may retrieve instructions and data from the memory 780, process the data using the instructions, and write-back the results to the memory 780.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A processor comprising:
a core area, wherein the core area comprises a plurality of processing cores including a first processing core and a set of processing cores, a plurality of per core caches including a first per core cache and a set of per core caches, and a plurality of line-fill buffers including a first line-fill buffer and a set of line-fill buffers, and
an uncore area coupled to the core area, wherein the uncore area comprises an extended buffer space coupled between the first line fill buffer and a last level cache (LLC) coupled to the extended buffer space,
wherein the first processing core is to offload a first weakly ordered transaction to write data stored in the first line-fill buffer to a memory coupled to the processor, to the extended buffer space after receiving a request for the data of the first weakly ordered transaction from the uncore area,
wherein the request for the data is generated before the first weakly ordered transaction is posted to the memory, and
wherein the first processing core is to de-allocate the first line-fill buffer after the first weakly ordered transaction is offloaded to the extended buffer space.

2. The processor of claim 1, wherein the first processing core is to store a second weakly ordered transaction after de-allocating the first line-fill buffer after the first weakly ordered transaction is offloaded to the extended buffer space.

3. The processor of claim 1, wherein the uncore area is to check a state of the data of the first weakly ordered transaction before sending the request to the first processing core, wherein the request is sent to the first processing core before sending a request for line ownership if the state is a cache miss state.

4. The processor of claim 1, wherein the uncore area is to check a state of the data of the first weakly ordered transaction before sending the request to the first processing core, wherein the request is sent to the first processing core after cross snoops sent to invalidate the set of per core caches returns without data if the state is a shared coherency state.

5. The processor of claim 1, wherein the uncore area is to check a state of the data of the first weakly ordered transaction before sending the request to the first processing core, wherein the request is sent to the first processing core after cross snoops sent to invalidate the set of per core cache returns without data if the state is an exclusive coherency state.

6. The processor of claim 1, wherein the uncore area is to check a state of the data of the first weakly ordered transaction before sending the request to the first processing core, wherein the request is sent to the first processing core after data generated by cross snoops is written to a memory if the state is a modified coherency state.

7. The processor of claim 1 further comprises a control unit, wherein the control unit is to track the status of the first weakly ordered transaction.

8. The processor of claim 7 the control unit further comprises a controller and a counter coupled to the controller, wherein the controller is to increment the counter after the first processing core receives the request for data from the uncore area.

9. The processor of claim 8, wherein the controller is to decrement the counter after the first processing core receives a transfer complete signal, wherein the transfer complete signal indicates that the first weakly ordered transaction is posted to the memory.

10. A method comprising:
storing a first weakly ordered transaction in a first line-fill buffer, wherein the first line-fill buffer is associated with a first processing core of a plurality of processing cores of a core area of a processor, offloading the first weakly ordered transaction to write data to a memory coupled to the processor to an extended buffer space after receiving a request for the data of the first weakly ordered transaction from an uncore area, wherein the uncore area includes the extended buffer space coupled between the first line-fill buffer and a last level cache (LLC) of the uncore area, wherein the request for the data is generated before the first weakly ordered transaction is posted to the memory, and de-allocating the first line-fill buffer after the first weakly ordered transaction is offloaded to the extended buffer space.

11. The method of claim 10 further comprising, storing a second weakly ordered transaction in the first line-fill buffer, wherein the second weakly ordered transaction is stored after de-allocating the first line-fill buffer after the first weakly ordered transaction is offloaded to the extended buffer space.

12. The method of claim 10 further comprising, checking a state of the data of the first weakly ordered transaction in the uncore area before sending the request for data to the first processing core, and sending the request for data to the first processing core before sending a request for line ownership if the state is a cache miss state.

13. The method of claim 10 further comprising, checking a state of the data of the first weakly ordered transaction in the uncore area before sending the request for data to the first processing core, and sending the request for data to the first processing core after cross snoops sent to invalidate a set of per core caches associated with other processing cores of the core area returns without data if the state is a shared coherency state.

14. The method of claim 10 further comprising, checking a state of the data of the first weakly ordered transaction in the uncore area before sending the request for data to the first processing core, and sending the request for data to the first processing core after cross snoops sent to invalidate a set of per core caches associated with other processing cores of the core area returns without data if the state is an exclusive coherency state.

15. The method of claim 10 further comprising, checking a state of the data of the first weakly ordered transaction in the uncore area before sending the request for data to the first processing core, and sending the request for data to the first processing core after data generated by cross snoops is written to the memory if the state is a modified coherency state.

16. The method of claim 10 further comprising tracking the status of the first weakly ordered transaction using a control unit.

17. The method of claim 16 further comprising incrementing a counter after the first processing core receives the request for data from the uncore area, wherein the control unit comprises the counter.

18. The method of claim 17 further comprising decrementing the counter after the first processing core receives a transfer complete signal, wherein the transfer complete signal indicates that the first weakly ordered transaction is posted to the memory.

19. A system comprising:

a processor including a plurality of cores including a first core, a plurality of line-fill buffers including a first line-fill buffer associated with the first core, an uncore area including an extended line-fill buffer coupled to the plurality of line-fill buffers and a last level cache (LLC) coupled to the extended line-fill buffer, wherein the first core is to store a write combining request in the first line-fill buffer, send the write combining request to the uncore area, increment a counter responsive to a signal from the uncore area to send data to the uncore area, decrement the counter responsive to a second signal from the uncore area to indicate that the write combining request is completed; and a memory coupled to the processor.

20. The system of claim 19, wherein the first core is to store a second transaction in the first line-fill buffer after de-allocating the first line-fill buffer after the write combining request is offloaded to the uncore area.

* * * * *